United States Patent
Cho et al.

(10) Patent No.: US 9,731,712 B1
(45) Date of Patent: Aug. 15, 2017

(54) CONTROL METHOD AND SYSTEM FOR HYBRID VEHICLE WITH DUAL-CLUTCH TRANSMISSION

(71) Applicant: Hyundai Motor Company, Seoul (KR)

(72) Inventors: Sung Hyun Cho, Gyeonggi-Do (KR); Young Min Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/173,820

(22) Filed: Jun. 6, 2016

(30) Foreign Application Priority Data

Feb. 12, 2016 (KR) .......................... 10-2016-0016198

(51) Int. Cl.
*B60W 10/113* (2012.01)
*B60W 10/06* (2006.01)
(Continued)

(52) U.S. Cl.
CPC ............. *B60W 20/50* (2013.01); *B60K 6/387* (2013.01); *B60K 6/46* (2013.01); *B60K 6/547* (2013.01); *B60W 10/08* (2013.01); *B60W 10/113* (2013.01); *B60W 10/184* (2013.01); *B60W 2510/0208* (2013.01); *B60W 2540/12* (2013.01); *B60Y 2200/92* (2013.01); *B60Y 2300/18125* (2013.01); *B60Y 2300/42* (2013.01); *B60Y 2300/60* (2013.01); *B60Y 2300/91* (2013.01); *B60Y 2400/428* (2013.01);
(Continued)

(58) Field of Classification Search
CPC .... B60W 20/50; B60W 10/08; B60W 10/113; B60W 10/184; B60K 6/46; B60K 6/387; B60K 6/547
See application file for complete search history.

(56) References Cited

U.S. PATENT DOCUMENTS 7,828,693 B2 * 11/2010 Soliman ................ B60K 6/445 477/3
8,509,978 B2 * 8/2013 Kato ...................... B60K 6/445 307/9.1
(Continued)

FOREIGN PATENT DOCUMENTS

JP    2010-083454 A    4/2010
JP    2013-203098 A    10/2013
(Continued)

*Primary Examiner* — Jacob S Scott
*Assistant Examiner* — Tinh Dang
(74) *Attorney, Agent, or Firm* — Mintz Levin Cohn Ferris Glovsky and Popeo, P.C.; Peter F. Corless

(57) ABSTRACT

A control method and system for a hybrid vehicle with a DCT is provided. The method includes monitoring whether clutch stuck off is sensed and requesting prohibition of regenerative braking by a driving motor and requesting braking control using mechanical braking force to a higher controller when clutch stuck off is sensed. A driving mode is then changed into a single clutch driving mode, in which a vehicle is driven in gear stages realized by a clutch other than the clutch in which the clutch stuck off occurred and the higher controller is requested to prohibit regenerative braking by the driving motor, when clutch stuck off has occurred. Additionally, the higher controller is requested to obtain the braking force for the vehicle from mechanical braking force is response to determining that single clutch shifting has been performed and braking is required.

12 Claims, 2 Drawing Sheets

(51) Int. Cl.
  *B60W 10/184*  (2012.01)
  *B60K 6/387*   (2007.10)
  *B60K 6/547*   (2007.10)
  *B60W 20/50*   (2016.01)
  *B60W 10/08*   (2006.01)
  *B60K 6/46*    (2007.10)

(52) U.S. Cl.
  CPC ........ *Y10S 903/914* (2013.01); *Y10S 903/919* (2013.01); *Y10S 903/93* (2013.01)

(56) References Cited

U.S. PATENT DOCUMENTS

| | | | |
|---|---|---|---|
| 9,341,241 B2 * | 5/2016 | Morio | F16H 3/78 |
| 9,636,987 B2 * | 5/2017 | Okubo | B60K 6/36 |
| 2017/0080943 A1 | 3/2017 | Feiner et al. | |

FOREIGN PATENT DOCUMENTS

| | | | | |
|---|---|---|---|---|
| JP | 2014097789 | | 5/2014 | |
| KR | 1020050048040 | | 5/2005 | |
| KR | 20110033723 | | 3/2011 | |
| KR | 20110033723 A | * | 3/2011 | ............ B60W 10/02 |
| KR | 20110134261 | | 12/2011 | |

\* cited by examiner

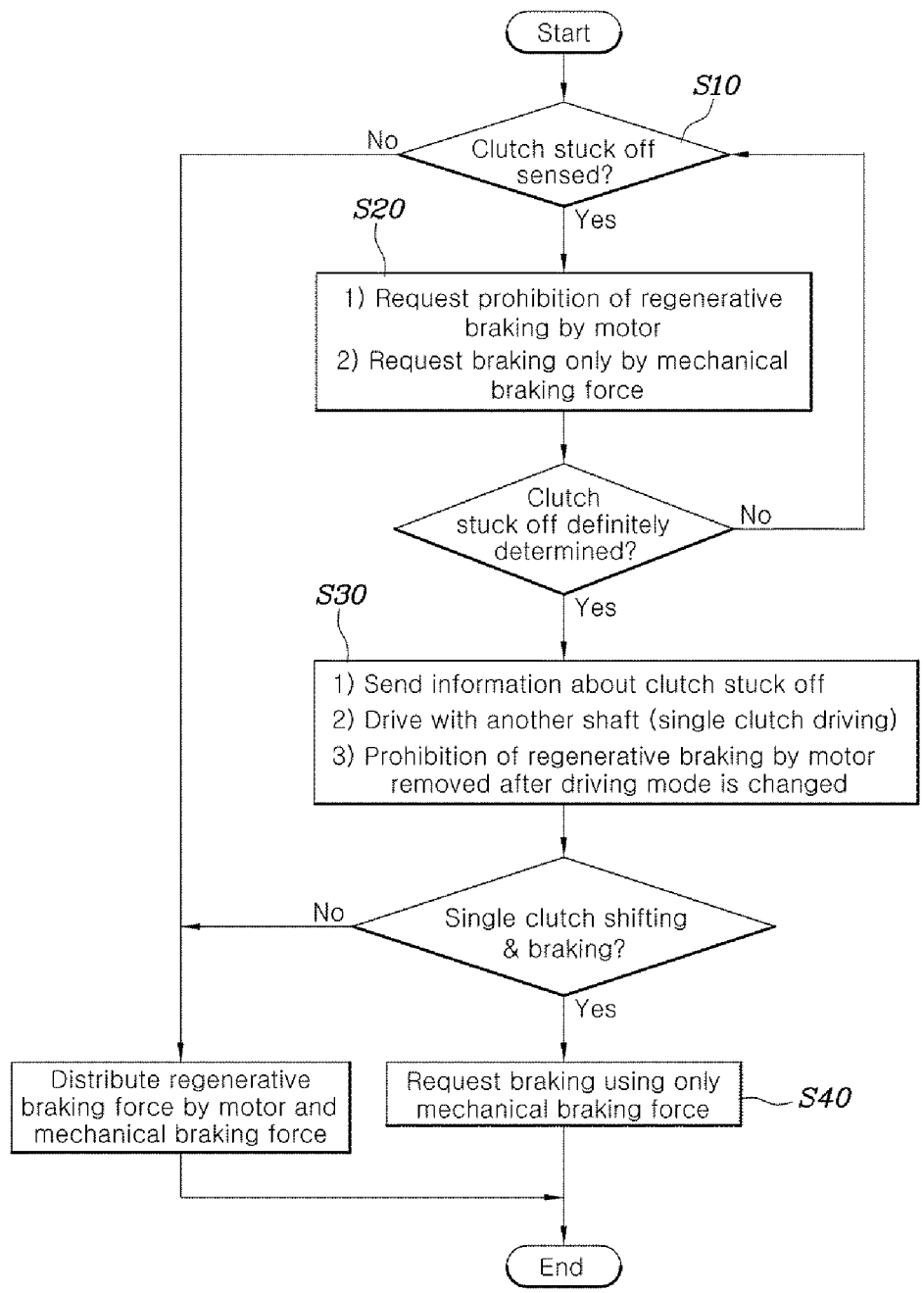

CONTROL METHOD AND SYSTEM FOR HYBRID VEHICLE WITH DUAL-CLUTCH TRANSMISSION

CROSS REFERENCE TO RELATED APPLICATION

The present application claims priority to Korean Patent Application No. 10-2016-0016198, filed Feb. 12, 2016, the entire contents of which is incorporated herein for all purposes by this reference.

BACKGROUND

Field of the Invention

The present invention relates to a control method and system for a hybrid vehicle with a dual-clutch transmission and, more particularly, to a technology for operating a vehicle in response to braking conditions.

Description of the Related Art

Generally, hybrid vehicles equipped with a dual-clutch transmission (DCT) are capable of using the mechanical braking force from a braking system, which is essentially provided thereto, and also regenerative braking force from a driving motor. For reference, braking force generated in a vehicle in a hydraulic or otherwise mechanical manner, rather than regenerative braking force generated by a driving motor, is hereinafter generally referred to as "mechanical braking force".

When two clutches in the DCT produce appropriate transfer torque under the operation of a controller, a vehicle may be appropriately driven and gears thereof may be shifted, and when a smooth power transmission is achieved between a driving motor and driving wheels upon regenerative braking, the necessary regenerative braking force may be obtained. However, the clutches of the DCT may break down or fail, and accordingly, a controller for the DCT is configured to detect whether the clutches produce appropriate transfer torque using a predetermined diagnosis method. Further, the position of a clutch actuator configured to operate the clutches is moved based on the result of the diagnosis. When the desired transfer torque is not substantially produced by the clutches and excessive slippage may be detected, this state is diagnosed as "clutch stuck off".

The description provided above as a related art of the present invention is just for aiding with the understanding the background of the present invention and should not be construed as being included in the related art known by those skilled in the art.

SUMMARY

Accordingly, the present invention provides a control method and system for a hybrid vehicle with a DCT that contribute to increasing the commercial value of a vehicle by improving the fuel efficiency of the vehicle using regenerative braking force as extensively as possible and by more stably ensuring braking force when clutch stuck off occurs in the vehicle.

According to one aspect of the present invention, a control method for a hybrid vehicle with a DCT may include: monitoring, by a controller, whether clutch stuck off is sensed by a sensor; requesting, by the controller, prohibition of regenerative braking by a driving motor and requesting braking control by a mechanical braking force to a higher controller when clutch stuck off is sensed; changing, by the controller, a driving mode into a single clutch driving mode, in which a vehicle may be driven at gear stages supported by a clutch other than a clutch in which clutch stuck off occurred and requesting the higher controller to prohibit regenerative braking by the driving motor in response to detecting that clutch stuck off has occurred, after the first restriction request; and requesting, by the controller, the higher controller to obtain braking force for the vehicle from a mechanical braking force in response to detecting that single clutch shifting has been performed and braking is required, after the mode is changed.

In particular, when the controller determines that clutch stuck off occurs, information regarding the clutch stuck off may be transmitted to the higher controller. After the mode is changed, in cases other than a case in which single clutch shifting is performed and braking is required, the higher controller may be configured to ensure a braking force required for the vehicle by combining a regenerative braking force from the driving motor with the mechanical braking force. After the first restriction request, the monitoring process may be repeated until the controller determines that clutch stuck off occurs, and when clutch stuck off is not sensed, the higher controller may be configured to ensure a braking force required for the vehicle by combining the regenerative braking force from the driving motor with the mechanical braking force. Additionally, after the mode is changed, when a brake pedal is operated, the controller may be configured to determine that the braking is required. When the driving mode is changed into the single clutch driving mode, the controller may be configured to request the higher controller to prohibit regenerative braking by the driving motor.

According to the control method and system for a hybrid vehicle with a DCT of the present invention, it may be possible to contribute to improving the commercial value of a vehicle by improving the fuel efficiency of the vehicle using regenerative braking force as extensively as possible and by more stably ensuring braking force when clutch stuck off occurs in the vehicle.

BRIEF DESCRIPTION OF THE DRAWINGS

The above and other objects, features and other advantages of the present invention will be more clearly understood from the following detailed description when taken in conjunction with the accompanying drawings, in which:

FIG. 2 is a flowchart illustrating a control method for a hybrid vehicle with a DCT according to an exemplary embodiment of the present invention.

DETAILED DESCRIPTION

Figure 1:
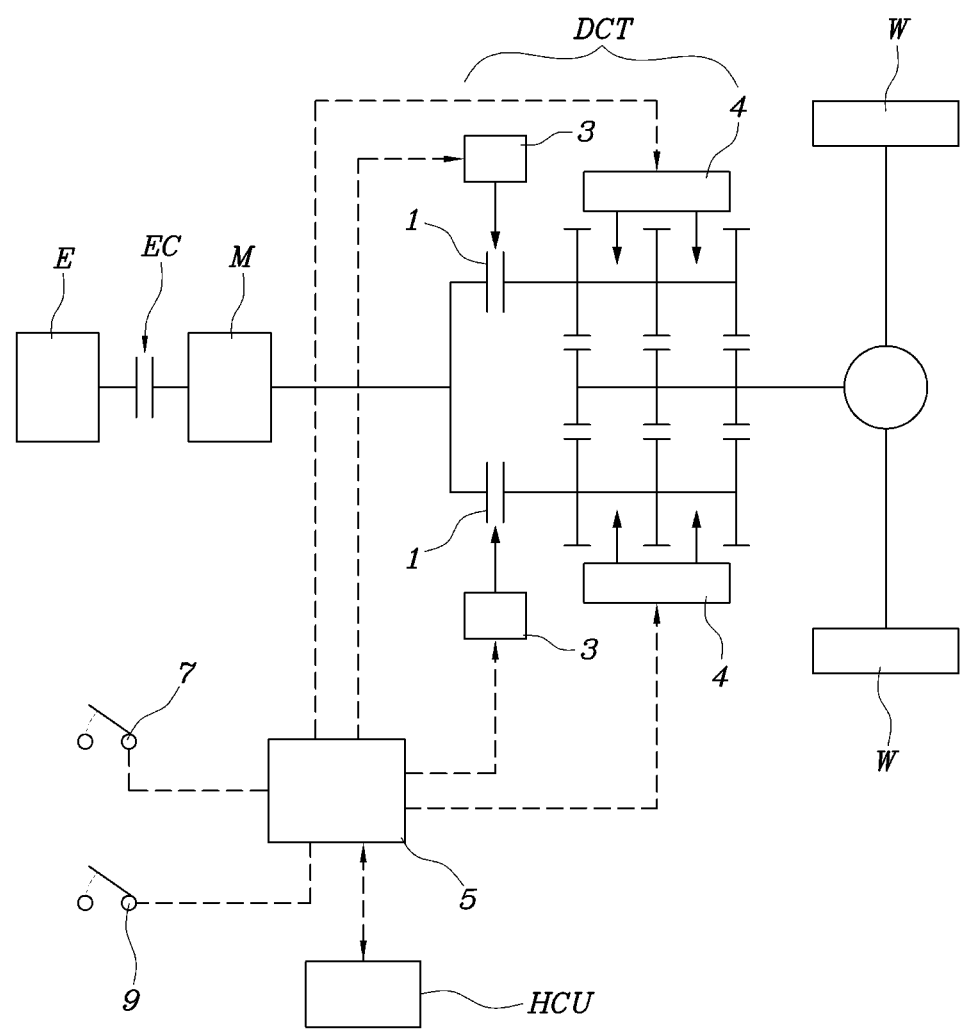
FIG. 1 is a diagram illustrating a powertrain of a vehicle with a DCT according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Referring to FIG. 1, the system of the present invention may include an engine E and a driving motor M may be connected to an engine clutch EC to supply power from the engine E and the driving motor M to driving wheels W through a DCT, two clutches 1 of the DCT may be operated by respective clutch actuators 3, shift gears configured to shift may be engaged by shifting actuators 4 configured to selectively operate synchronizers, the clutch actuators 3 and the shifting actuators 4 may be operated by a DCT controller 5, and the controller may be configured to receive a signal from an accelerator position sensor 7 to receive information regarding an engagement degree of an accelerator pedal (e.g., the amount of pressure exerted onto the pedal) and a signal from a brake pedal position sensor 9 to receive information regarding operation of a brake pedal (e.g., engagement of brake pedal). The controller may include a processor and a memory, wherein the processor may be configured to execute the method as described herein below.

Particularly, the DCT controller 5 may be configured to receive information such as engine torque and engine speed and may be configured to communicate with a hybrid control unit (HCU), which is a higher controller (e.g. an overall vehicle controller), and the higher controller may be configured to distribute regenerative braking force and mechanical braking force from the driving motor M. The DCT controller 5 and the higher controller may be separated in this exemplary embodiment, but alternatively may be integrated in a single unit. Further, the controllers may be integrated or separated and connected via communication (e.g., wireless communication, controller area network communication, etc.), similar to the engine controller configured to operate the engine.

Referring to FIG. 2, an exemplary embodiment of the method of present invention may include: monitoring, by the DCT controller 5, whether clutch stuck off is sensed (S10); requesting, by the DCT controller 5, prohibition of regenerative braking by the driving motor M and braking control via mechanical braking force to the higher controller (S20) when clutch stuck off is sensed; changing, by the DCT controller 5, a driving mode into a single clutch driving mode, in which a vehicle is driven in a gear stage realized by a clutch other than the clutch in which the clutch stuck off occurred and requesting the higher controller to prohibit regenerative braking by the driving motor M, when the DCT controller 5 determines that clutch stuck off has occurred (S30); and requesting, by the DCT controller 5, the higher controller to obtain of the braking force for the vehicle from mechanical braking force when the DCT controller 5 determines that single clutch shifting has been performed and braking is required (S40).

In other words, when the DCT controller 5 determines that clutch stuck off has occurred, the DCT controller 5 may be configured to prohibit regenerative braking by the driving motor M to allow the vehicle to be decelerated by mechanical braking force in the first restriction request process (S20), and stable braking force for the vehicle may be ensured. When clutch stuck off has occurred and the DCT controller 5 has determined that clutch stuck off has occurred, the DCT controller 5 may be configured to change the driving mode into the single clutch driving mode to allow the vehicle to be driven using only one other clutch.

For example, for odd-numbered clutches for odd-numbered gears, that is, first, third, and fifth gears, when clutch stuck off is determined, the DCT controller 5 may be configured to engage even-numbered clutches for the even-numbered gears, that is, second, fourth, and sixth gears, to allow the vehicle to be driven by the even-numbered clutches, and accordingly, the vehicle may be driven in the even-numbered gears. When the driving mode is changed, the DCT controller 5 may be configured to request the higher controller to lift or release the prohibition of regenerative braking by the driving motor M and thus, when necessary, regenerative braking may be achieved even while the vehicle is being driven in the single clutch driving mode. Accordingly, the fuel efficiency of the vehicle may be improved with the result of improved gas mileage.

However, after the mode is changed (S30), when single clutch shifting is performed and braking is required, the corresponding clutch may be configured to block torque between the driving motor M and the driving wheels and appropriate regenerative braking may not be possible, which may cause a problem with the braking performance of the vehicle, potentially resulting in a dangerous situation. Accordingly, regenerative braking may be prohibited for stability of braking and the braking force required for the vehicle is obtained from the mechanical braking force at least in this situation, thereby ensuring the stability of braking of the vehicle.

When the DCT controller 5 determines that clutch stuck off has occurred in the mode changing process (S30), information regarding the clutch stuck off may be transmitted to the higher controller and the higher controller may take other necessary measures in response to the clutch stuck off. Additionally, after the mode is changed (S30), the higher controller may be configured to ensure a braking force required for the vehicle by combining the regenerative braking force from the driving motor M with the mechanical braking force. For example, the other necessary measures indicated above may include providing a notification to a driver regarding a malfunction of the clutch by displaying an alarm or warning.

Further, after the first restriction request process (S20), the monitoring process (S10) may be repeated until the DCT controller 5 determines that clutch stuck off has occurred, and when clutch stuck off is not sensed, the higher controller may be configured to ensure the braking force required for the vehicle by combining the regenerative braking force from the driving motor M with the mechanical braking force. After the mode is changed (S30), when the brake pedal is operated, the DCT controller 5 may be configured to determine that braking is required. In other words, when a brake pedal sensor (BPS) signal is input by engagement of the brake pedal during shifting, the second restriction request process (S40) may be performed.

Although the present invention was described with reference to specific exemplary embodiments shown in the drawings, it is apparent to those skilled in the art that the present invention may be changed and modified in various ways without departing from the scope of the present invention, which is described in the following claims.

What is claimed is:

1. A control method for a hybrid vehicle with a dual-clutch transmission (DCT), comprising:
   monitoring, by a DCT controller, whether clutch stuck off is sensed;
   requesting, by the DCT controller, prohibition of regenerative braking by a driving motor and requesting braking control by a mechanical braking force to a higher controller when clutch stuck off is sensed;
   changing, by the DCT controller, a driving mode into a single clutch driving mode, in which a vehicle is driven at gear stages supported by a clutch other than a clutch in which the clutch stuck off occurred and requesting the higher controller to prohibit regenerative braking by the driving motor, in response to determining that clutch stuck off has occurred; and
   requesting, by the DCT controller, the higher controller to obtain braking force for the vehicle from a mechanical braking force in response to determining that single clutch shifting has been performed and braking is required.

2. The method of claim 1, wherein in the mode changing process, when the DCT controller determines that clutch stuck off occurs, information regarding the clutch stuck off is transmitted to the higher controller.

3. The method of claim 1, wherein after the mode changing process, the higher controller ensures a braking force required for the vehicle by combining a regenerative braking force from the driving motor with the mechanical braking force.

4. The method of claim 1, wherein the monitoring process is repeated until the DCT controller determines that clutch stuck off occurs, and when clutch stuck off is not sensed, the higher controller ensures a braking force required for the vehicle by combining the regenerative braking force from the driving motor with the mechanical braking force.

5. The method of claim 1, wherein after the mode is changed, when a brake pedal is engaged, the DCT controller is configured to determine that the braking is required.

6. The method of claim 1, wherein when the driving mode is changed into the single clutch driving mode, the DCT controller is configured to request the higher controller to prohibit regenerative braking by the driving motor.

7. A control system for a hybrid vehicle with a dual-clutch transmission (DCT), comprising:
   a memory configured to store program instructions; and
   a processor configured to execute the program instructions, the program instructions when executed configured to:
   monitor whether clutch stuck off is sensed;
   request prohibition of regenerative braking by a driving motor and requesting braking control by a mechanical braking force to a vehicle controller when clutch stuck off is sensed;
   change a driving mode into a single clutch driving mode, in which a vehicle is driven at gear stages supported by a clutch other than a clutch in which the clutch stuck off occurred and request the vehicle controller to prohibit regenerative braking by the driving motor, in response to determining that clutch stuck off has occurred; and
   request the vehicle controller to obtain braking force for the vehicle from a mechanical braking force in response to determining that single clutch shifting has been performed and braking is required.

8. The system of claim 7, wherein when the clutch stuck off is determined, information regarding the clutch stuck off is transmitted to the vehicle controller.

9. The system of claim 7, wherein the higher controller ensures a braking force required for the vehicle by combining a regenerative braking force from the driving motor with the mechanical braking force.

10. The system of claim 7, wherein the program instructions when executed are further configured to:
    repeat the monitoring process is repeated until that clutch stuck off occurs, and when clutch stuck off is not sensed, the vehicle controller ensures a braking force required for the vehicle by combining the regenerative braking force from the driving motor with the mechanical braking force.

11. The system of claim 7, wherein the program instructions when executed are further configured to:
    determine that the braking is required when a brake pedal is engaged.

12. The system of claim 7, wherein the program instructions when executed are further configured to:
    request the vehicle controller to prohibit regenerative braking by the driving motor when the driving mode is changed into the single clutch driving mode.

* * * * *